United States Patent [19]

Rameson

[11] 3,970,296

[45] July 20, 1976

[54] WORK HOLDING CLAMP

[75] Inventor: William Watson Rameson, Santa Monica, Calif.

[73] Assignee: TRW Inc., Redondo Beach, Calif.

[22] Filed: Aug. 4, 1975

[21] Appl. No.: 601,948

[52] U.S. Cl. .................................... 269/32; 269/93; 269/134

[51] Int. Cl.[2] .......................................... B23Q 3/08

[58] Field of Search .................... 269/27, 32, 91, 93, 269/94, 134–137, 228, 270, 289, 321 A

[56] References Cited

UNITED STATES PATENTS

| | | | |
|---|---|---|---|
| 1,954,708 | 4/1934 | Mass | 269/321 A |
| 2,873,653 | 2/1959 | Wilson | 269/134 |
| 2,991,669 | 7/1961 | Stock | 269/135 |
| 3,157,081 | 11/1964 | Abrams | 269/270 |
| 3,347,542 | 10/1967 | Mericle | 269/228 |
| 3,724,836 | 4/1973 | Sendoykas | 269/94 |

FOREIGN PATENTS OR APPLICATIONS

| | | | |
|---|---|---|---|
| 778,765 | 7/1957 | United Kingdom | 269/228 |

*Primary Examiner*—Al Lawrence Smith
*Assistant Examiner*—Robert C. Watson
*Attorney, Agent, or Firm*—Daniel T. Anderson; Donald R. Nyhagen; Jerry A. Dinardo

[57] ABSTRACT

A work clamp for clamping a workpiece to a work table with a clamp member which extends and retracts to and from clamping position with a compound motion having components parallel to and normal to the table in a manner such that extensile movement of the member occurs both parallel to the table to a position over the workpiece and toward the table to clamp the workpiece against the table, and retractile movement of the member occurs both away from the table to release the workpiece and parallel to the table to clear the workpiece for removal from and placement on the table.

5 Claims, 2 Drawing Figures

WORK HOLDING CLAMP

BACKGROUND OF THE INVENTION

1. Field of the Invention

This invention relates generally to work holding devices for machine tools and the like, and more particularly, to a work holding clamp for clamping a workpiece to a work table.

2. Prior Art

As will appear from the ensuing description, the work clamp of this invention may be used for a variety of work holding or clamping applications. The primary application of the clamp, however, involves clamping to a work table, such as the table of a machine tool, a workpiece whose placement on and removal from the table requires movement of the workpiece relative to the table along a path normal to the table. The invention will be described in the context of this particular application.

In this described application, the workpiece is a part to be machined and which is located in machining position on the work table of a machine tool by engagement of the part in a vertical locating socket on the table. Placement of the part in and removal of the part from machining position, thus requires vertical movement of the part relative to the table to insert the part into and withdraw the part from the locating socket. Projecting laterally from the part is a flange which seats against the work table about the socket and to which vertical clamping pressure is to be applied to clamp the part to the table and thereby firmly retain the part in the socket.

A work clamp for this particular application must satisfy two requirements. First, the work engaging clamp member of the clamp must be movable toward and away from the work table to apply clamping pressure to and relieve clamping pressure from the flange. Secondly, the clamp member must be movable parallel to the table for extension to a position over the flange, wherein extension of the member toward the table is effective to engage the member with and apply clamping pressure to the flange, and for retraction of the member from the latter position to clear the flange for unobstructed removal of the part from as well as initial placement of the part on the work table.

SUMMARY OF THE INVENTION

This invention provides a work clamp which satisfies the two requirements stated above and is thus particularly adapted for the described work holding or clamping application. As noted earlier, however, the clamp may be used for other clamping applications.

The work clamp comprises a mounting base for attachment to a work table or the like, such as the work table of a machine tool. Mounted on this base for extension and retraction to and from a clamping position is a clamp member and means for extending and retracting the member. The clamp member extends and retracts with a compound motion having components parallel to and normal to the table surface in a manner such that during extension the member undergoes simultaneous motion parallel to and toward the table to clamp a workpiece to the table. During retraction, the clamp member undergoes simultaneous motion away from and parallel to the work table to release the workpiece and clear the latter for unobstructed removal from as well as initial placement on the work table.

As noted earlier, in the particular work clamping application described, the workpiece is a part which is inserted into a vertical locating socket on the work table of a machine tool for locating the part in machining position wherein a lateral flange on the part rests on the table. The described work clamp is mounted on the work table at one side of the locating socket and is connected to the clamp base by parallel pivoted links in a manner such that the clamp constitutes, in effect, a parallelogram linkage arrangement. Extension of the clamp member occurs horizontally toward the work part and vertically toward the table to engage a pressure foot on the member with the work part flange to clamp the flange to the table. Retraction of the clamp member occurs vertically away from the table and horizontally away from the work part to release and clear the flange for vertical removal of the part from and initial placement of the part on the table. The clamp member is extended by a fluid actuator and retracted by spring action.

DESCRIPTION OF THE PREFERRED EMBODIMENTS

Figure 1:
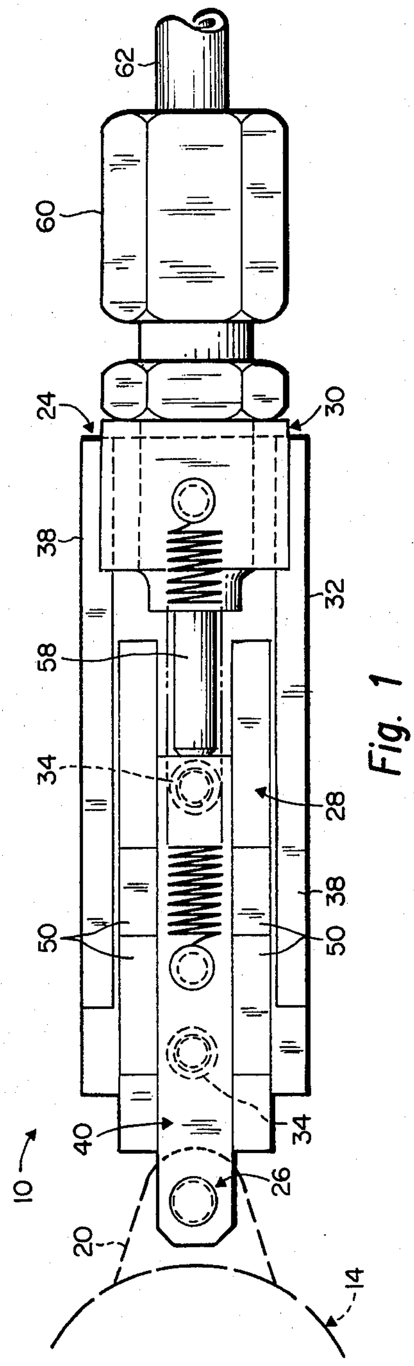
FIG. 1 is a top plan view of a work clamp according to the invention.

The drawings illustrate a work clamp 10 according to the invention mounted on a work table 12 for clamping a workpiece 14 to the table. In this case, the table is a work table of a machine tool and the workpiece is a part to be machined by the tool. The workpiece is located in its illustrated machining position on the table 12 by engagement of a lower spindle-like portion 16 of the workpiece in a vertical locating socket 18 on the table. The workpiece has a lateral flange 20 which rests on the table when the piece is located in machining position and a portion 22 above the flange to be machined. Placement of the workpiece in and removal of the workpiece from the work table 12 requires vertical movement of the workpiece relative to the table to insert and remove its lower portion 16 into and from the locating socket 18.

Work clamp 10 is mounted on the work table 12 at one side of the socket 18 and is operative to clamp the workpiece flange 20 against the table and thereby firmly retain the workpiece 14 in its machining position within the socket. Generally speaking, the clamp comprises a mounting base 24 to be attached to the table, a work-engaging member clamp member 26, means 28 supporting the clamp member on the base for extension to and retraction from a clamping position, shown in solid lines, with a compound motion having mutually perpendicular components, and clamp operating means 30 for extending and retracting the clamp member.

In the particular work clamp shown, the components of the compound extensional and retractile motion of the clamp member 26 are parallel to and normal to the work table 12, respectively. Extensional movement of the clamp member occurs horizontally toward the workpiece 14 to a position over the workpiece flange 20 and vertically toward the table to clamp the flange to the table. Retractile movement of the clamp member occurs vertically away from the table and horizontally away from the workpiece to release and clear the flange for removal of the workpiece from and initial placement of the workpiece on the table.

Referring in more detail to the work clamp 10 illustrated, the clamp base 24 comprises a base plate 32 to be attached by bolts 34 to the work table 12 with the bottom surface 36 of the plate resting on the table. Rigidly joined to and rising from the base plate 32 are a pair of upstanding flanges 38 disposed in spaced parallel relation.

Clamp member 26 comprises a generally L-shaped plate 40, the rear longer leg 42 of which is horizontal and the front shorter leg 44 of which is vertical. Depending from the lower end of the shorter leg 44 is a pressure foot 46 in the form of a screw threaded in the leg and fixed in position by a jaw nut 48. This pressure foot is axially adjustable.

Clamp member supporting means 28 comprises four parallel links 50, the upper ends of which straddle and are attached by pivots 52 to the clamp member plate 40. The lower ends of these links are positioned between the mounting base flanges 38 and are attached to the flanges by pivots 54.

From the foregoing description of the work clamp 10 and its illustration in the drawings, it will be understood that the mounting base 24, clamp member 26, and supporting links 50 effectively constitute a parallelogram linkage arrangement wherein the clamp member is extendable to its solid line clamping position and retractable to its broken line retracted position with a compound motion having a horizontal component parallel to the work table 12 and a vertical component normal to the table. Thus, extensile movement of the clamp member occurs horizontally parallel to and vertically downward toward the table. Retractile movement of the clamp member occurs vertically upward away from and horizontally parallel to the table.

Clamp operating means 30 comprises a fluid pressure actuator 56 fixedly mounted on the upper edges of the mounting base flanges 38 and having a plunger 58 seating against the adjacent rear end of the clamp member plate 40. Connected to the actuator by a coupling 60 is a hose 62 through which the actuator may be pressurized to extend its plunger 58 against the clamp member plate 40 and thereby extend the clamp member 26 to its solid line clamping position. The clamp member is retracted by a tension spring 64 connected between the clamp member plate 40 and the actuator 56.

Work clamp 10 is mounted on the work table 12 in a position such that extensile movement of the clamp member 26 occurs horizontally toward the axis of locating socket 18 and hence toward workpiece 14 to a position where its pressure foot 46 overlies the workpiece flange 20 and vertically toward the table to press the pressure foot against the flange and thereby clamp the latter firmly against the table. Retractile movement of the clamp member occurs vertically away from the table to release the flange and horizontally away from the workpiece to the broken line retracted position, wherein the clamp member clears the flange for the vertical removal of the workpiece from its locating socket 18 as well as initial placement of the workpiece in the socket.

Figure 2:
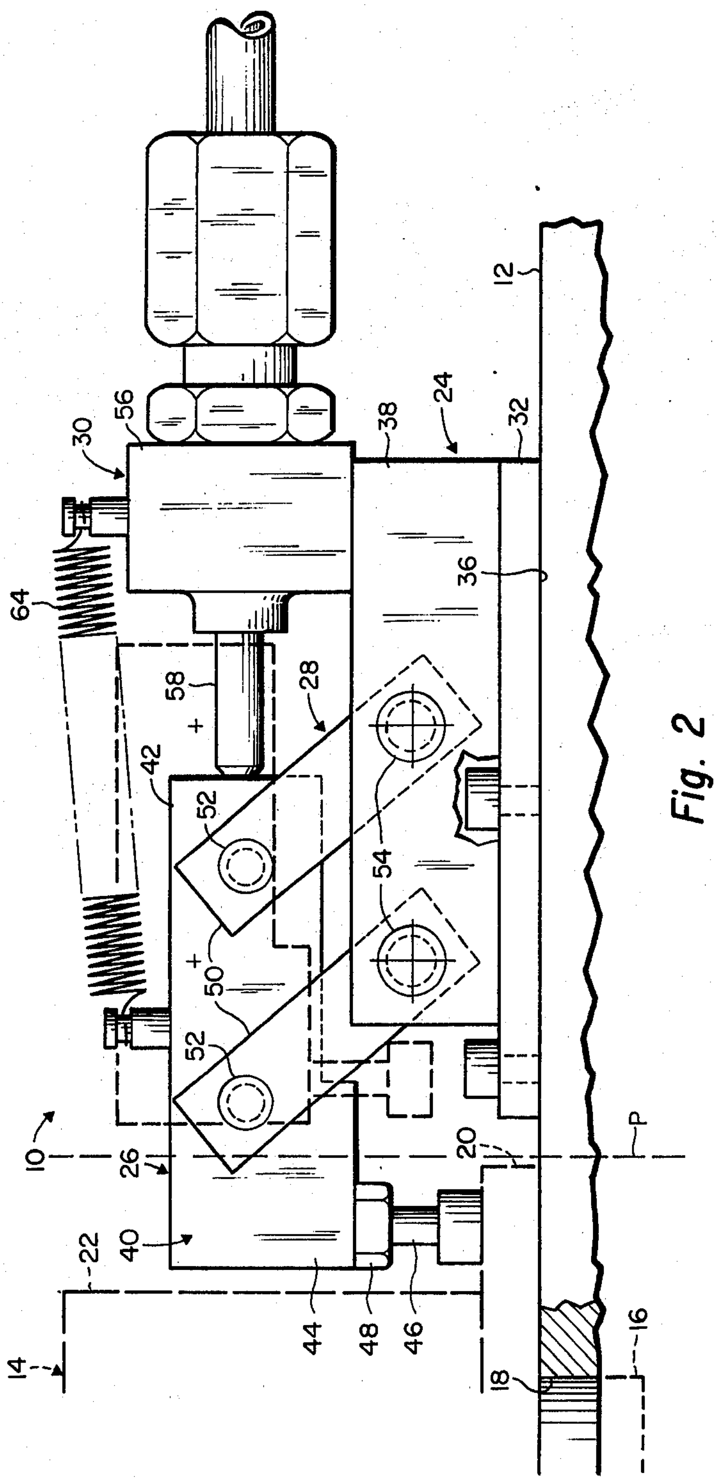
FIG. 2 is a side elevation of the clamp.

In connection with this extension and retraction movement of the clamp member 26, refer to FIG. 2, wherein reference character P denotes a plane normal to the work table 12 and hence to the plane of the base surface 36 passing between the workpiece flange 20 and the adjacent end of the clamp base 24. Extension movement of the clamp member occurs across this plane to clamp the work flange 20. Retraction movement of the clamp member occurs back across the plane P to a retracted position wherein the clamp member is located entirely at the base side of the plane to clear the workpiece for vertical placement on and removal from the work table.

What is claimed is:

1. A work clamp for clamping a workpiece to a work table comprising:

a base to be attached to the work table with a surface of the base seating against the table;

a generally L-shaped clamp member including a first leg overlying said base and a second transverse leg at one end of said first leg comprising a work engaging pressure foot facing the plane of said base surface;

parallel links pivotally attached to said base and first clamp member leg forming with said clamp member and base a parallelogram linkage arrangement supporting said clamp member on said base for extension and retraction relative to said base in a manner such that said extension movement occurs longitudinally of said first leg toward one end of said base and across a plane normal to said base surface plane and located a distance beyond said one base end and simultaneously laterally of said first leg toward said base surface plane to a clamping position wherein said pressure foot is located beyond said normal plane for clamping engagement with a workpiece located beyond said normal plane, and said retraction movement occurs laterally of said first leg away from said base surface plane and longitudinally of said first leg toward the other end of said base to a retracted position wherein said clamping member is located entirely at the base side of said plane to clear said workpiece for placement on and removal from said work table along a direction line normal to said table; and fluid pressure actuator means for extending and retracting said clamp member.

2. A work clamp according to claim 1 wherein:

said first clamp member leg has a longitudinally presented end face at the other end of the latter leg; and said fluid pressure actuator means comprises a fluid pressure actuator on said other base end including a fluid pressure actuated plunger extending longitudinally of said first clamp member leg and seating against said end face of the latter leg for driving said latter leg endwise toward said one base end.

3. A work clamp according to claim 1 wherein:

said links are generally normal to said base surface plane in said retracted position of said clamp member and incline toward said one base end at an oblique angle to said latter plane in said extended position of said clamp member.

4. A work clamp according to claim 1 wherein:

the pivot axes of said links on said first clamp member leg are spaced along the latter leg and located in a common plane parallel to said base surface plane; and the pivot axes of said links on said base are spaced along said base and located in a common plane parallel to said surface plane.

5. A work clamp according to claim 1 wherein:

the pivot axes of said links on said first clamp member leg are spaced along the latter leg and located in a common plane parallel to said base surface plane;

the pivot axes of said links on said base are spaced along said base and located in a common plane parallel to said surface plane;

said links are generally normal to said base surface plane in said retracted position of said clamp member and incline toward said one base end at an oblique angle to said latter plane in said extended position of said clamp member;

said first clamp member leg has a longitudinally presented end face at the other end of the latter leg; and said fluid pressure actuator means comprises a fluid pressure actuator on said other base end including a fluid pressure actuated plunger extending longitudinally of said first clamp member leg and seating against said end face of the latter leg for driving said latter leg endwise toward said one base end.

* * * * *